(12) United States Patent
Hong et al.

(10) Patent No.: US 11,177,861 B2
(45) Date of Patent: Nov. 16, 2021

(54) ELECTRONIC DEVICE AND CONTROL METHOD THEREFOR

(71) Applicant: Samsung Electronics Co., Ltd., Suwon-si (KR)

(72) Inventors: Sangho Hong, Suwon-si (KR); Sanggi Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/046,366

(22) PCT Filed: Jan. 14, 2019

(86) PCT No.: PCT/KR2019/000554
§ 371 (c)(1),
(2) Date: Oct. 9, 2020

(87) PCT Pub. No.: WO2019/203424
PCT Pub. Date: Oct. 24, 2019

(65) Prior Publication Data
US 2021/0135712 A1    May 6, 2021

(30) Foreign Application Priority Data

Apr. 16, 2018    (KR) .................. 10-2018-0044066

(51) Int. Cl.
*H04B 7/04* (2017.01)
*H04B 7/0404* (2017.01)
*H04B 17/309* (2015.01)

(52) U.S. Cl.
CPC ......... *H04B 7/0404* (2013.01); *H04B 17/309* (2015.01)

(58) Field of Classification Search
CPC . H04B 7/02; H04B 7/028; H04B 7/04; H04B 7/0404; H04B 7/0413;
(Continued)

(56) References Cited

U.S. PATENT DOCUMENTS 7,403,748 B1 * 7/2008 Keskitalo ................ H04B 7/06
                                                          455/101
8,711,966 B2 * 4/2014 Schroeder ................ H01Q 1/08
                                                          375/267

(Continued)

FOREIGN PATENT DOCUMENTS

JP    2007-258858 A    10/2007
KR    10-2008-0002795 A    1/2008
(Continued)

OTHER PUBLICATIONS

International Search Report dated Apr. 30, 2019, in corresponding International Patent Application No. PCT/KR2019/000554.

*Primary Examiner* — Siu M Lee
(74) *Attorney, Agent, or Firm* — Staas & Halsey, LLP

(57) ABSTRACT

Disclosed are an electronic device and a control method thereof. The electronic device includes: a housing; a plurality of antennas respectively installed in a plurality of locations spaced from each other in the housing; a communicator configured to transmit and receive a communication signal through the antenna; and at least one processor configured to: select a combination of two or more antennas having a relatively higher quality out of the plurality of antennas based on a transmission and reception quality of the communication signal; and control the communicator to transmit and receive the communication signal through the selected combination of antennas.

11 Claims, 12 Drawing Sheets

(58) Field of Classification Search
CPC ...... H04B 7/0417; H04B 7/0421; H04B 7/06; H04B 7/0602; H04B 7/0604; H04B 7/0608; H04B 7/061; H04B 7/0613; H04B 17/309; H04B 17/336; H04B 17/345

See application file for complete search history.

(56) References Cited

U.S. PATENT DOCUMENTS

| | | | |
|---|---|---|---|
| 9,444,540 B2* | 9/2016 | Yu | H04B 7/0602 |
| 10,903,883 B2* | 1/2021 | Tsai | H04B 7/0802 |
| 2007/0047560 A1* | 3/2007 | Tsai | H04B 7/0695 |
| | | | 370/401 |
| 2010/0120379 A1* | 5/2010 | Fukagawa | H01Q 1/2266 |
| | | | 455/90.2 |
| 2011/0280188 A1 | 11/2011 | Jeon et al. | |
| 2014/0220902 A1* | 8/2014 | Clevorn | H04B 7/0814 |
| | | | 455/63.4 |
| 2018/0062718 A1 | 3/2018 | Clevorn et al. | |
| 2018/0331714 A1* | 11/2018 | See | H04B 1/58 |
| 2019/0132013 A1* | 5/2019 | Sharma | H04W 88/182 |

FOREIGN PATENT DOCUMENTS

| | | |
|---|---|---|
| KR | 10-0876797 B1 | 1/2009 |
| KR | 10-2013-0117404 A | 10/2013 |
| KR | 10-2014-0018959 A | 2/2014 |
| KR | 10-2017-0077787 A | 7/2017 |

\* cited by examiner

ELECTRONIC DEVICE AND CONTROL METHOD THEREFOR

CROSS-REFERENCE TO RELATED APPLICATIONS

This application is a U.S. National Stage Application which claims the benefit under 35 U.S.C. § 371 of International Patent Application No. PCT/KR2019/000554 filed on Jan. 14, 2019, which claims foreign priority benefit under 35 U.S.C. § 119 of Korean Patent Application 10-2018-0044066 filed on Apr. 16, 2018, in the Korean Intellectual Property Office, the contents of both of which are incorporated herein by reference.

TECHNICAL FIELD

The disclosure relates to an electronic device and a control method thereof, and more particularly, to an electronic device for transmitting and receiving a communication signal, and a control method thereof.

BACKGROUND ART

As TVs perform various functions, various connectivity communication systems including a communication unit, e.g. Wi-Fi have been incorporated into TVs. In particular, many of the latest TVs include a multi input multi output (MIMO) antenna. MIMO is a multi-antenna technology whereby a combination of radio signals is transmitted from a plurality of transmission antennas to a plurality of reception antennas, and may enable faster communication.

As TVs have become slim in thickness, broadside radiation to a communication antenna installed in a TV is not available and thus an antenna is placed in an edgy portion of a TV. In such case, however, functions of antennas drastically change in accordance with radio wave environment due to TV installation environment.

For example, Wi-Fi is affected by the location of an access point (AP) connected to a TV, the status of metal objects such as a display cupboard around a TV, the location of a support in the case of a stand-type TV and the status of a wall in the case of a wall-mounted TV. If a TV directly performs a P2P communication with a user's mobile device, such communication is made under various radio signal environments depending on the location of the mobile device. In the case of a TV including a TV receiver therein, the radio signal environment varies depending on a distance between the interior and the exterior, direction of windows or doors connected to the exterior, etc.

Technical Problem

An aspect of the disclosure is to solve the conventional problems described above, and provide an electronic device which is able to perform communication with excellent signal quality even under various radio signal environments.

Technical Solution

According to an embodiment of the disclosure, there is provided an electronic device including: a housing; a plurality of antennas respectively installed in a plurality of locations spaced from each other in the housing; a communicator configured to transmit and receive a communication signal through the antenna; and at least one processor configured to: select a combination of two or more antennas having a relatively higher quality out of the plurality of antennas based on a transmission and reception quality of the communication signal; and control the communicator to transmit and receive the communication signal through the selected combination of antennas.

Accordingly, even if the electronic device is placed under any radio signal environment, a communication signal is transmitted through a combination of antennas having relatively higher quality out of the plurality of antennas installed in different locations in the electronic device, and thus communication may be performed with excellent signal quality even under various radio signal environments.

The at least one processor may be configured to select a combination of antennas having a relatively lower degree of mutual interference out of the plurality of antennas.

Accordingly, as a communication signal may be transmitted and received through the selected combination of antennas having the relatively lower degree of mutual interference, communication may be performed with improved signal quality.

The at least one processor may be configured to: control the communicator to transmit a transmission signal through a first antenna out of the plurality of antennas; and identify a degree of mutual interference between the first antenna and a second antenna based on a reception signal of the second antenna that has received the transmission signal.

The first antenna may include an antenna that has a relatively higher transmission and reception quality of the transmission signal out of the plurality of antennas.

Accordingly, as the combination of antennas may be selected by measuring only the degree of mutual interference between the first antenna selected by a predetermined standard and another antenna, the foregoing method is more efficient than the method for selecting the combination of antennas by measuring the degree of mutual interference among all antennas.

The housing may have a rectangular shape, and the plurality of antennas may include an antenna located adjacently to each corner of the housing.

The antenna and the communicator may be integrally provided.

The electronic device may further include a switch arranged between the antenna and the communicator, and the at least one processor is configured to control the switch to connect the antenna, which is included in the selected combination of antennas, out of the plurality of antennas to the communicator.

The at least one processor may be configured to attempt to select a new combination of antennas when a quality of a communication signal transmitted and received through the previously selected combination of antennas is a predetermined standard or lower. Otherwise, the at least one processor may be configured to attempt to select a new combination of antennas when predetermined time elapses after the transmission signal is transmitted and received through the previously selected combination of antennas.

Accordingly, the transmission and reception quality of the communication signal may be continuously maintained.

The at least one processor may be configured to: control the communicator to transmit a communication signal, which the plurality of antennas requests for connection for communication; and measure a transmission quality of the plurality of antennas based on a feedback signal to the communication signal.

Accordingly, as the method for measuring the quality of the communication signal varies, technical reliability of the disclosure is further improved.

According to an embodiment of the disclosure, there is provided a control method of an electronic device including a communicator configured to transmit and receive a communication signal through a plurality of antennas installed in a plurality of locations spaced from each other in a housing, the control method including: selecting a combination of two or more antennas having a relatively higher quality out of the plurality of antennas, based on a transmission and reception quality of the communication signal; and controlling the communicator to transmit and receive the communication signal through the selected combination of antennas.

Accordingly, even if the electronic device is placed under any radio signal environment, a communication signal is transmitted through a combination of antennas having relatively higher quality out of the plurality of antennas installed in different locations in the electronic device, and thus communication may be performed with excellent signal quality even under various radio signal environments.

The selecting may include selecting a combination of antennas having a relatively lower degree of mutual interference out of the plurality of antennas.

Accordingly, as a communication signal may be transmitted and received through the selected combination of antennas having the relatively lower degree of mutual interference, communication may be performed with improved signal quality.

The selecting may include: controlling the communicator to transmit a transmission signal from a first antenna out of the plurality of antennas, and identifying a degree of mutual interference between the first antenna and a second antenna based on a reception signal of the second antenna that has received the transmission signal.

The first antenna may include an antenna that has a relatively higher transmission and reception quality of the transmission signal out of the plurality of antennas.

Accordingly, as the combination of antennas may be selected by measuring only the degree of mutual interference between the first antenna selected by a predetermined standard and another antenna, the foregoing method is more efficient than the method for selecting the combination of antennas by measuring the degree of mutual interference among all antennas.

The electronic device may include a switch arranged between the antenna and the communicator, and the control method may include controlling the switch to connect the antenna, which is included in the selected combination of antennas, out of the plurality of antennas to the communicator.

The control method may include attempting to select a new combination of antennas if the quality of the transmission signal transmitted and received through the previously selected combination of antennas is of a predetermined standard or lower. Otherwise, the control method may include attempting to select a new combination of antennas if predetermined time elapses after the transmission signal is transmitted and received through the previously selected combination of antennas.

Accordingly, the transmission and reception quality of the communication signal may be continuously maintained.

The selecting may include controlling the communicator to transmit a communication signal requesting for communication by the plurality of antennas and measuring the transmission quality of the plurality of antennas based on a feedback signal with respect to the communication signal.

Accordingly, as the method for measuring the quality of a communication signal is various, technical reliability of the disclosure is further improved.

According to an embodiment of the disclosure, there is provided a computer program which is stored in a medium to execute the control method by being coupled to the electronic device.

The computer program may be stored in a medium in a server and downloaded to the electronic device through a network.

Advantageous Effects

As described above, according to the disclosure, communication can be performed with excellent signal quality even under various radio signal environments.

BEST MODE

Below, embodiments of the disclosure will be described in detail with reference to accompanying drawings. In drawings, like numerals or marks refer to elements that substantially perform like functions, and the size of each element may be exaggerated for clarity of description and for convenience. The technical idea, key configuration and effect of the disclosure are not limited to the configuration or effect described in embodiments set forth below. If it is determined that any detailed description on a known technology or configuration related to the disclosure may unnecessarily blur the gist of the disclosure, such detailed description will be omitted.

In embodiments of the disclosure, terms containing ordinal numbers such as first and second are used only for distinguishing an element from other elements, and the singular also includes the plural unless the context requires otherwise. In embodiments of the disclosure, terms 'consist of', 'include', and 'have' must be understood as not excluding in advance the likelihood of existence of addition of one or more other characteristics, numbers, steps, operations, elements, components or combinations of the foregoing. In embodiments of the disclosure, the term 'module' or 'unit' refers to the one performing at least one function or operation, and the one that may be implemented as hardware or software or a combination of hardware and software, and may be integrated as at least one module to be implemented as at least one processor. In embodiments of the disclosure, at least one of a plurality of elements refers to not only all of the plurality of elements but also a single element out of the plurality of elements or a combination of the foregoing. The term 'configured to' may not mean only 'specifically designed to' in terms of hardware. Instead, under certain circumstances, the expression "a device configured to" may mean that the device "is able to" be with other devices or components. For example, the phrase "processor configured to perform A, B and C" may mean an exclusive processor (e.g. embedded processor) for performing the relevant operation, or a generic-purpose processor (e.g. CPU or application processor) which may perform the relevant operations by executing at least one software program stored in a memory device.

Figure 1:
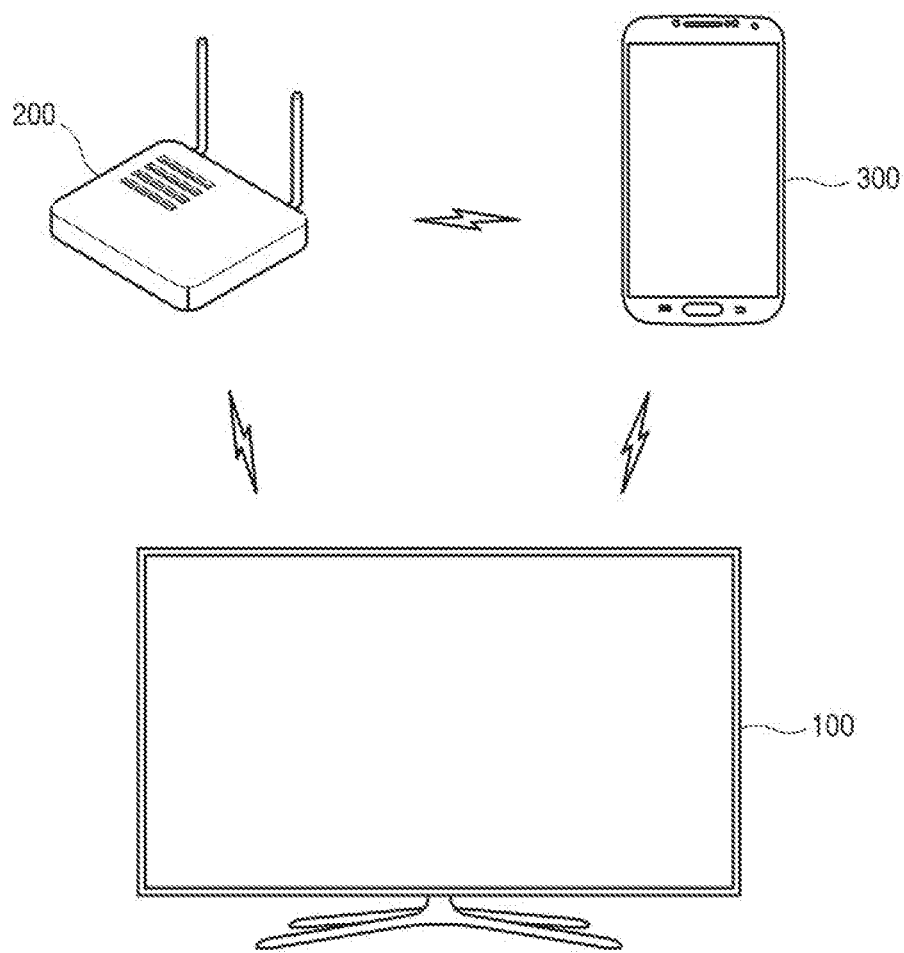
FIG. 1 illustrates an electronic device according to an embodiment of the disclosure.

FIG. 1 illustrates an electronic device according to an embodiment of the disclosure. The electronic device 100 according to the embodiment of the disclosure may be implemented as, e.g. a set-top box. Also, an electronic device 100 according to another embodiment of the disclosure may be implemented as a display apparatus including a display, such as a TV, smart phone, tablet PC, mobile phone, smart watch, wearable device such as a head-mounted display, computer, multimedia player, electronic frame, digital advertising signs, large format display (LFD), and digital signage. However, the electronic device 100 according to the embodiment of the disclosure is not limited to the foregoing, and may vary as long as it may transmit, receive and process communication signals.

The electronic device 100 according to the embodiment of the disclosure may transmit and receive a communication signal. For example, if the electronic device 100 includes a Wi-Fi module, the electronic device 100 may communicate with an access point (the "AP") 200 or communicate with an external device 300 connected to the AP 200, by transmitting and receiving a communication signal to and from the AP 200. Otherwise, the electronic device 100 according to the embodiment of the disclosure may directly transmit and receive a communication signal to and from the external device 300.

Figure 2:
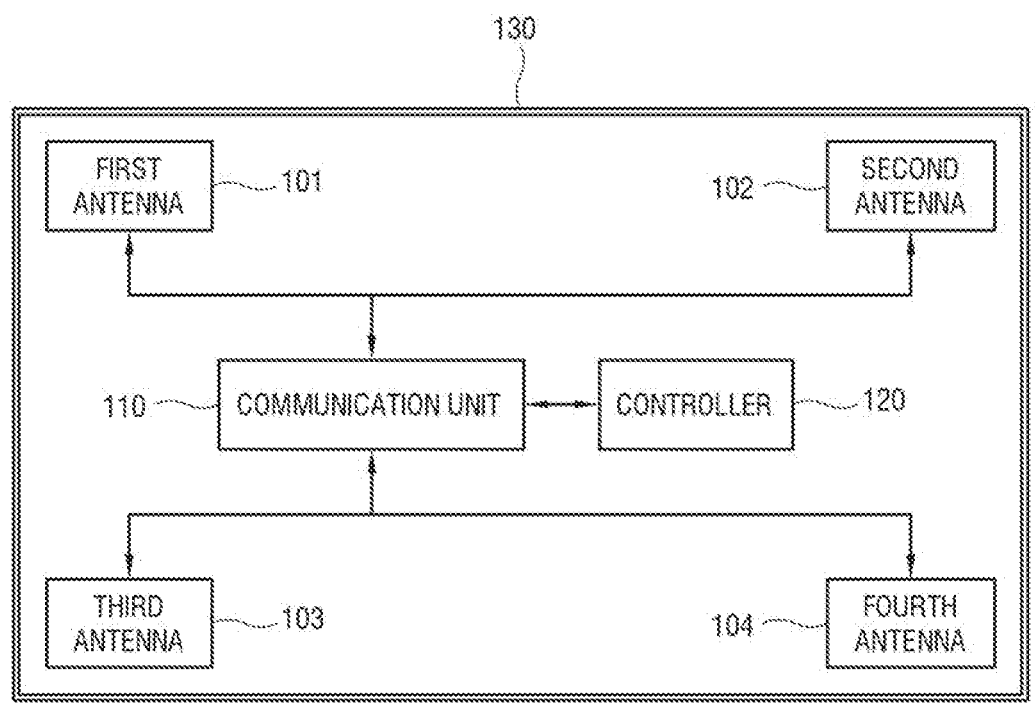
FIG. 2 is a block diagram of an electronic device according to an embodiment of the disclosure.

FIG. 2 is a block diagram of the electronic device according to the embodiment of the disclosure. The electronic device 100 according to the embodiment of the disclosure includes antennas 101-104, a communication unit 110, and a controller 120. The foregoing elements are contained or installed in a housing 130 covering the electronic device 100. However, the elements of the electronic device 100 in FIG. 2 are an example, and the electronic device 100 according to the embodiment of the disclosure may be implemented with other elements. That is, the electronic device 100 according to the embodiment of the disclosure may be added with other elements other than those in FIG. 2, or may exclude part of the elements in FIG. 2 for implementation.

The antennas 101-104 transmits or receives a communication signal in a form of a radio signal. The antennas 101-104 may vary as long as they may convert an electromagnetic wave in a certain region into an electric signal, or on the contrary convert an electric signal into an electromagnetic wave for transmission, and there are no particular restrictions on the form of implementation of the antennas 101-104.

The antennas 101-104 are installed in a plurality of locations spaced from one another in the housing 130. That is, the antennas 101-104 are installed in different locations in the housing 130. For example, if the housing 130 has a rectangular shape, the antennas 101-104 may be located adjacently to each corner of the housing 130. However, the shape of the housing 130 or the locations of the antennas 101-104 in the housing 130 is not limited to the foregoing, and may vary e.g. as long as they can correspond to different radio signal environments. For convenience of description, the case where the housing 130 has a rectangular shape and the antennas 101-104 are located adjacently to each corner of the housing 130 will be described hereinafter.

The communication unit 110 as a communicator transmits and receives a communication signal through the antennas 101-104. The communication unit 110 may perform wired or wireless communication. The communication unit 110 may be implemented with various communication methods such as Wi-Fi, Wi-Fi Direct, Ethernet, Bluetooth, Bluetooth Low Energy (BLE), Serial Port Profile (SPP), Zigbee, infrared communication, RF communication, Ultra-Wide Band (UWB), Wireless USB, and Near Field Communication (NFC). In the case of a wired communication, the communication unit 110 may further include a connection unit including a connecter or terminal for wired connection. The communication unit 110 may be implemented as a device, S/W module, circuit, or chip.

FIG. 2 illustrates an example in which the antennas 101-104 and the communication unit 110 are provided as separate elements, but not limited thereto. That is, the antennas 101-104 and the communication unit 110 may be integrally provided.

The controller 120 may perform control operations to operate elements of the electronic device 100. The controller 120, may control the communication unit 110 to transmit and receive a communication signal through an antenna. The controller 120 may include a control program (or an instruction) to perform a control operation, a non-volatile memory in which a control program is installed, a volatile memory to which at least part of the installed control program is loaded, and at least one processor or CPU executing the loaded control program. The control program may be stored in other electronic devices other than the electronic device 100.

The control program may include a program(s) that is implemented as at least one of BIOS, device driver, operating system, firmware, platform and application. According to an embodiment, an application may be installed or stored in advance in the electronic device 100 at the time of manufacture of the electronic device 100, or may be installed in the electronic device 100 at the time of its use in the future based on data of the application transmitted from the outside. The data of the application program may be downloaded from an external server such as an application market to the electronic device 100, but not limited thereto. The controller 120 may be implemented as one of, or a combination of, a device, S/W module, circuit and chip.

The controller 120 may perform its own processing operation other than the function of controlling other elements. In such case, the controller 120 may additionally include a separate processor.

FIG. 2 illustrates an example of the controller 120 and the communication unit 110 that are provided as separate elements, but the elements according to the disclosure are not limited thereto. For example, the controller 120 and the communication unit 110 may be integrally provided.

The electronic device 110 according to the embodiment of the disclosure may further include a switch to connect at least part of the plurality of antennas to the communication unit 110. Details of the switch 140 may be described later.

The electronic device 110 according to the embodiment of the disclosure may further include a power supply to supply power to each element of the electronic device 110, an image input unit to input an image signal to the electronic device 110, and a display to output an image signal that has been input to the electronic device 110 and processed.

Figure 3:
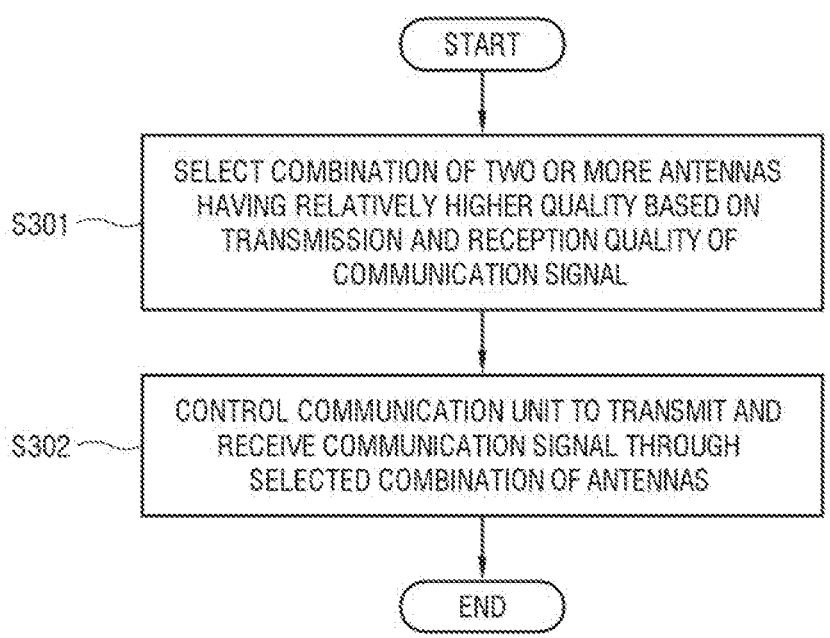
FIG. 3 is a flowchart showing operations of an electronic device according to an embodiment of the disclosure.

FIG. 3 illustrates operations of the electronic device 100 according to the embodiment of the disclosure.

The controller 120 of the electronic device 100 according to the embodiment of the disclosure selects a combination of two or more antennas with relatively higher quality out of the plurality of antennas 101-104 that are installed in different locations in the housing 130 (S301). The transmission and reception quality of a communication signal may be set as an RX quality indicator defined by various communication systems such as RSSI, Signal to Noise Ratio (SNR), Carrier to Noise Ratio (CNR) and link quality. Otherwise, the transmission and reception quality of a communication signal may be determined by using an indicator such as a gain level of an amplifier of a reception terminal or gain level of local in RF link or analysis result such as signal size in a modem. However, the measurement method or standard for transmission and reception quality is not limited to the foregoing. For example, according to the disclosure, the quality of a Tx signal through the antennas 101-104 may be measured as the transmission and reception quality. This will be described in more detail later.

Following the selection of the combination of the antennas based on the transmission and reception quality of a communication signal, the controller 120 controls the communication unit 120 to transmit and receive a communication signal through the combination of the selected antennas (S302). Hereinafter, this will be described in more detail with reference to FIG. 4.

Figure 4:
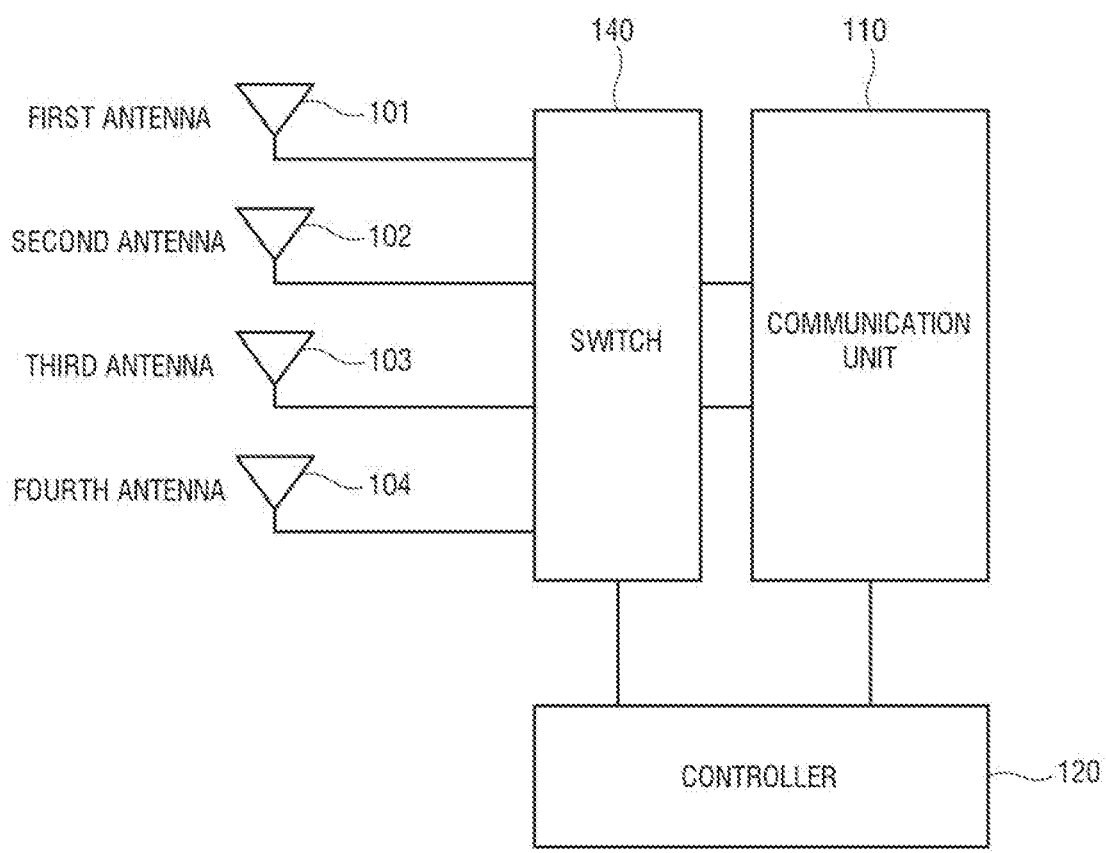
FIG. 4 illustrates an example of a configuration for selecting a circuit for each combination of antennas in the electronic device according to an embodiment of the disclosure.

FIG. 4 illustrates an example of elements for selecting a circuit for each combination of antennas in the electronic device according to the embodiment of the disclosure.

As shown therein, the electronic device 100 according to the embodiment of the disclosure includes a switch 140 provided between the antennas 101-104 and the communication unit 110. The switch 140 forms a circuit according to each combination of antennas by causing at least part of the plurality of antennas 101-104 to be connected to, or to be disconnected from, the communication unit 110, by a control of the controller 120 or the communication unit 110. The switch 140 may be formed by DP4T, SPDT, other switches or a combination of the foregoing switches. For convenience of description, the case where the switch 130 is a DP4T switch will be described as an example, but the switch 140 according to the disclosure is not limited to the foregoing. Also, for convenience of description, the case where the electronic device 100 according to the embodiment of the disclosure transmits and receives a communication signal by using 2×2 MIMO antenna technology will be described as an example, but the MIMO antenna technology applicable to the disclosure is not limited to the foregoing.

The controller 120 of the electronic device 100 according to the embodiment of the disclosure may, e.g. with respect to all combination of antennas consisting of two of the four antennas 101-104, control the switch 140 and the communication 110 to measure a transmission and reception quality of a communication signal according to each combination of antennas. For example, if RSSI is used as the standard for measuring the transmission and reception quality of a communication signal, the controller 120 may, with respect to each combination of the antenna 1-antenna 2, antenna 1-antenna 3, antenna 1-antenna 4, antenna 2-antenna 3, antenna 2-antenna 4 and antenna 3-antenna 4, control the switch 140 to connect the each combination of antennas to the communication unit 110, measure an RSSI with respect to each combination, and then compare the RSSI of each combination to determine and select the combination of antennas with relatively higher quality. For example, if it is measured that the RSSI of the combination of the antenna 1-antenna 4 is the largest, the controller 120 may control the switch 140 to connect the first antenna 101 and the fourth antenna 104 to the communication unit 110, and control the communication unit 110 to receive a communication signal by using 2×2 MIMO antenna technology using the first antenna 101 and fourth antenna 104.

Accordingly, even if the electronic device is placed in any radio signal environment, the electronic device receives a communication signal through a combination of two or more antennas with relatively higher quality out of the plurality of antennas installed in different locations in the electronic device, thereby performing communication with excellent signal quality under various radio signal environments.

Figure 5:
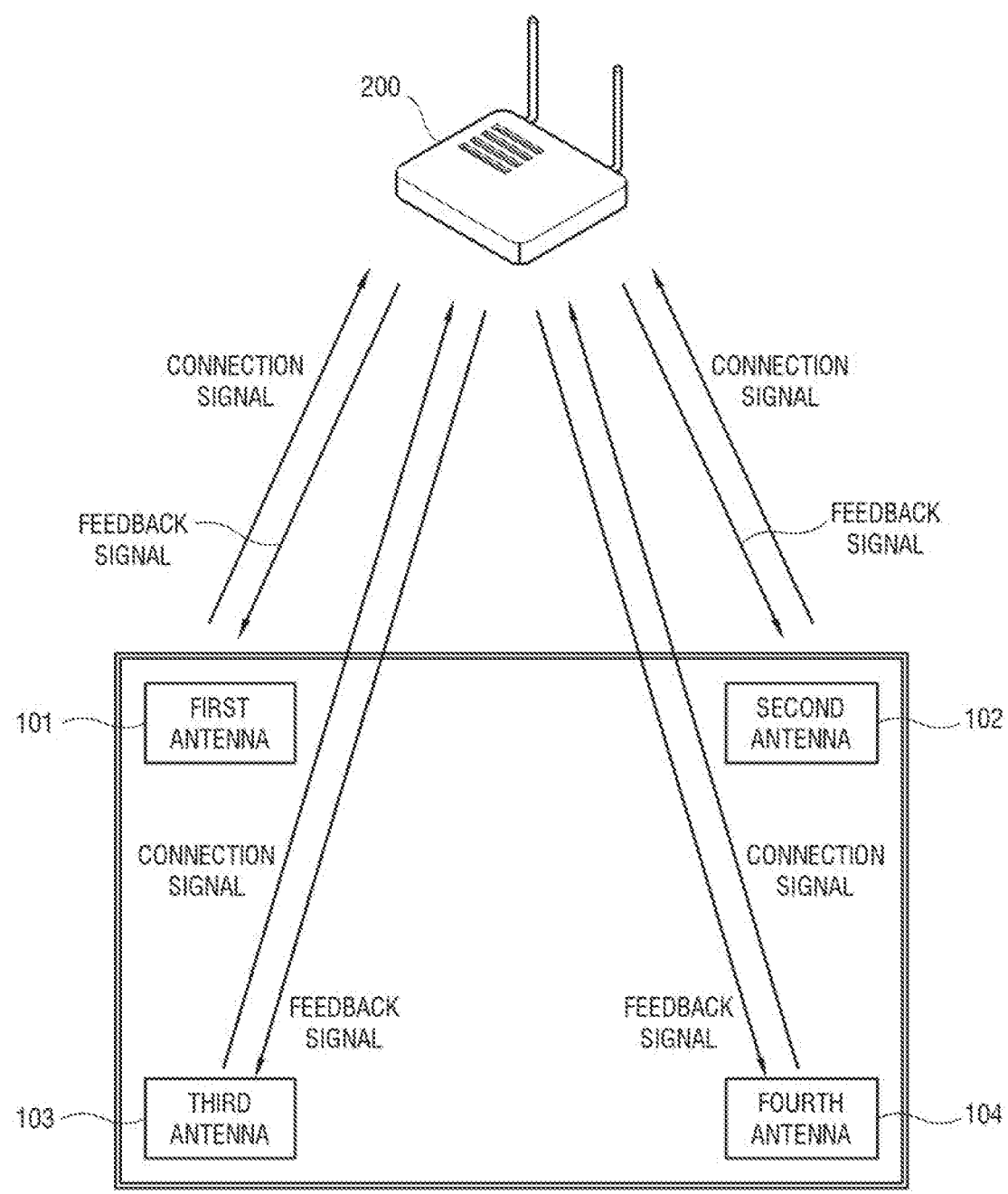
FIG. 5 illustrates an example of selecting a combination of antennas by a controller according to an embodiment of the disclosure.

The example of measuring the quality of a communication signal by using the RSSI as one of RX quality indicators has been described. However, as mentioned above, the standard for measuring the quality of a communication signal according to the disclosure is not limited to the RSSI. As an example, the controller 120 of the electronic device 100 according to the embodiment of the disclosure may measure a transmission and reception quality with the quality of a Tx signal. For example, the controller 120 of the electronic device 100 according to the embodiment of the disclosure may control the communication unit 110 to transmit a communication signal requesting for connection for communication by the plurality of antennas, and may measure a transmission quality of the plurality of antennas 110 based on a feedback signal with respect to the communication signal. This will be described in detail with reference to FIG. 5.

If the communication unit 110 is a Wi-Fi module, the controller 120 may control the communication unit 110 to transmit a connection signal as a communication signal requesting for connection for communication to the AP 200 through the antennas 101-104. After receiving a communication signal from the respective antennas 101-104, the AP 200 transmits to the respective antennas 101-104 a feedback signal (a signal evaluating the quality of connection signals as high, medium and low) with respect to connection signals. Accordingly, the respective antennas 101-104 receive the feedback signal from the AP 200 with respect to the connection signal transmitted by the respective antennas 101-104. The controller 120 may measure the quality of the connection signal transmitted by the respective antennas 101-104 based on the respective feedback signals transmitted to the respective antennas 101-104. Then, the controller 120 may select a combination of two or more antennas with relatively higher quality, and may control the communication unit 110 to transmit and receive a communication signal through the selected combination of antennas.

Furthermore, the controller 120 may select a combination of antenna by considering a quality indicator measured by using the Rx signal as explained above, as well as the quality indicator measured by using the Tx signal.

Accordingly, as the method for measuring the quality of a communication signal is various, technical reliability of the disclosure is further improved.

As above, the example of selecting the combination of two or more antennas with relatively higher quality out of the plurality of antennas based on the transmission and reception quality of a communication signal has been described, but the embodiment of the disclosure is not limited to the foregoing. For example, the controller 120 of the electronic device 100 according to the embodiment of the disclosure may select a combination of antennas with a relatively lower degree of mutual interference out of the plurality of antennas 101-104.

Figure 6:
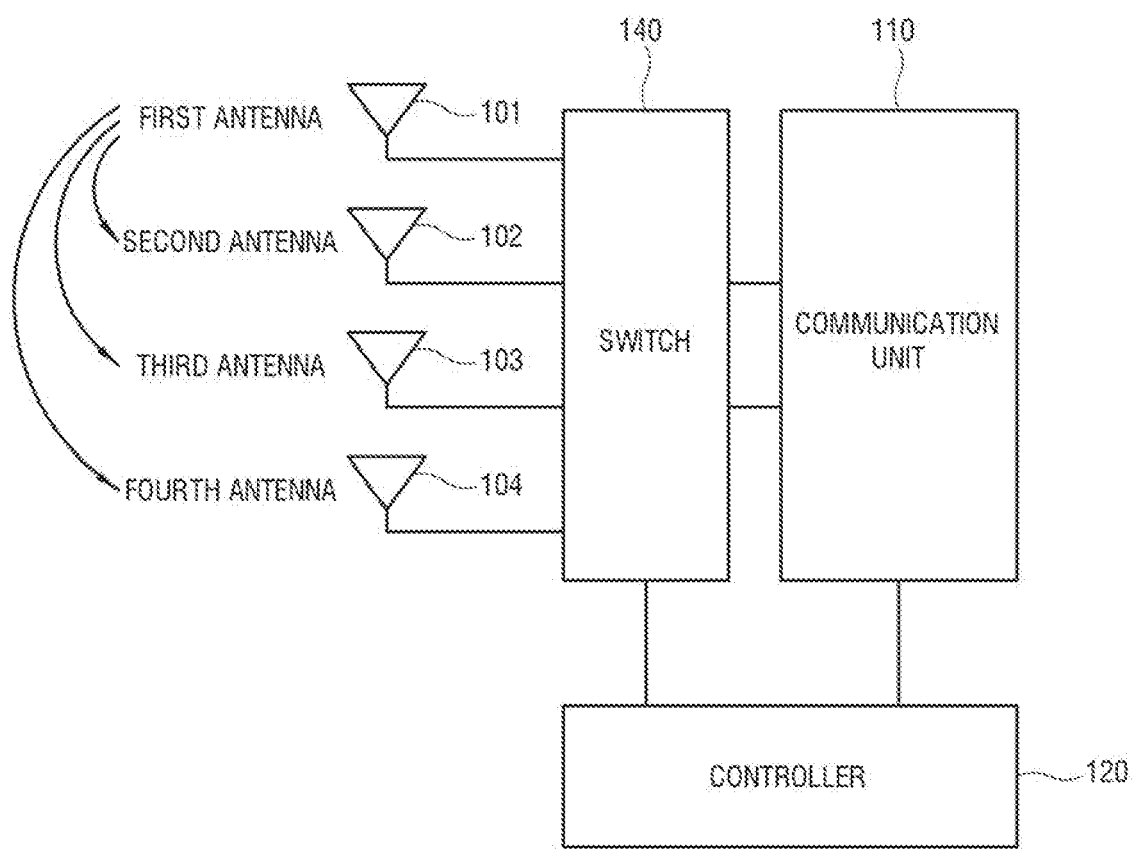
FIGS. 6 and 7 illustrate an example of selecting a combination of antennas, which has a relatively lower degree of mutual interference between antennas, by a controller according to an embodiment of the disclosure.
Figure 7:
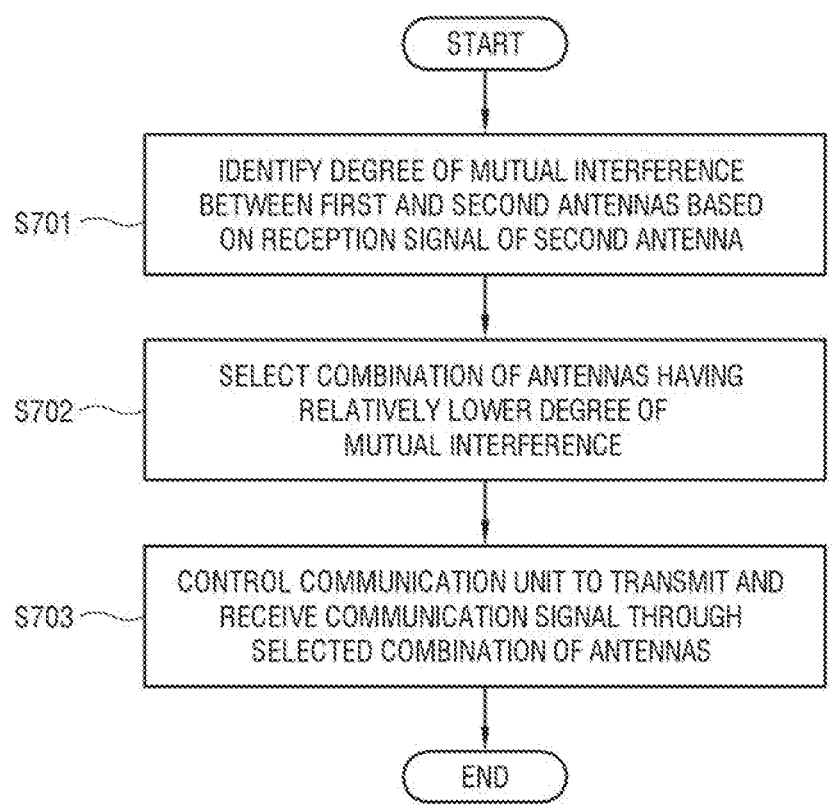

An example of selecting a combination of antennas with a relatively lower degree of mutual interference between antennas will be described with reference to FIGS. 6 and 7.

For example, if a communication signal is transmitted and received by using two antennas by using 2×2 MIMO antenna technology, the controller 120 of the electronic device 100 according to the embodiment of the disclosure may, with respect to all of a pair of antennas, measure the degree of mutual interference between such pair of antennas by causing one of the pair of antennas to transmit a signal and causing the other one of the same to receive the signal. That is, the controller 120 may, with respect to a first antenna and a second antenna out of a plurality of antennas, control the communication unit 110 to transmit a transmission signal by the first antenna, and based on a reception signal of the second antenna which has received the signal from the first antenna, may identify the degree of mutual interference between the first antenna and the second antenna (S701).

A detailed example will be described with reference to FIG. 6. The controller 120 may control the communication unit 110 to transmit a communication signal by the first antenna 101, and may control the communication unit 110 to receive a communication signal transmitted by the first antenna 101 to the remaining antennas, i.e. the second antenna 102, the third antenna 103 and the fourth antenna 104, and then may analyze the communication signal transmitted to the second, third and fourth antennas 102, 103 and 104 to thereby measure the degree of mutual interference between each of the foregoing three antennas and the first antenna 101. For example, the strength of the transmission signal transmitted to the second antenna 102, the third antenna 103 and the fourth antenna 104 may be used to measure the mutual interference between each of the three antennas and the first antenna 101. The stronger the received transmission signal is, the greater the mutual interference between each antenna and the first antenna 101 is.

The controller 120 may also perform the foregoing process with respect to the second antenna 102, the third antenna 103 and the fourth antenna 104 to thereby measure the degree of mutual interference between all pairs of antennas. That is, the controller 120 may control to transmit a communication signal from the second antenna 102 and to the third antenna 103 and the fourth antenna 104, and may measure the strength of the signal received by the third and fourth antennas 103 and 104 to measure the degree of mutual interference between the second and third antennas 102 and 103 and between the second and fourth antennas 102 and 104. Also, the controller may control to transmit a communication signal from the third antenna 103 to the fourth antenna 104 and measure the strength of the signal received by the fourth antenna 104 to thereby measure the degree of mutual interference between the second and fourth antennas 102 and 104.

Based on the foregoing result of measurement, the controller 120 selects a combination of antennas having a relatively lower degree of mutual interference (S702), and controls the communication unit 110 to transmit and receive a communication signal through the selected combination of antennas (S703).

The example of measuring the degree of mutual interference between a pair of antennas out of four antennas has been explained for convenience of explanation. However, the total number of antennas and the number of antennas among which the degree of mutual interference is measured are not limited to the foregoing example. Also, in the foregoing embodiment, one antenna transmits a communication signal and the remaining antennas receive the communication signal. However, the transmission and reception method is not limited to the foregoing example. Alternatively, one antenna may receive a communication signal and the remaining antennas may transmit a communication signal.

Accordingly, as the combination of antennas having a relatively lower degree of mutual interference is selected and used to transmit and receive a communication signal, thereby enabling performance of communication with improved signal quality.

Figure 8:
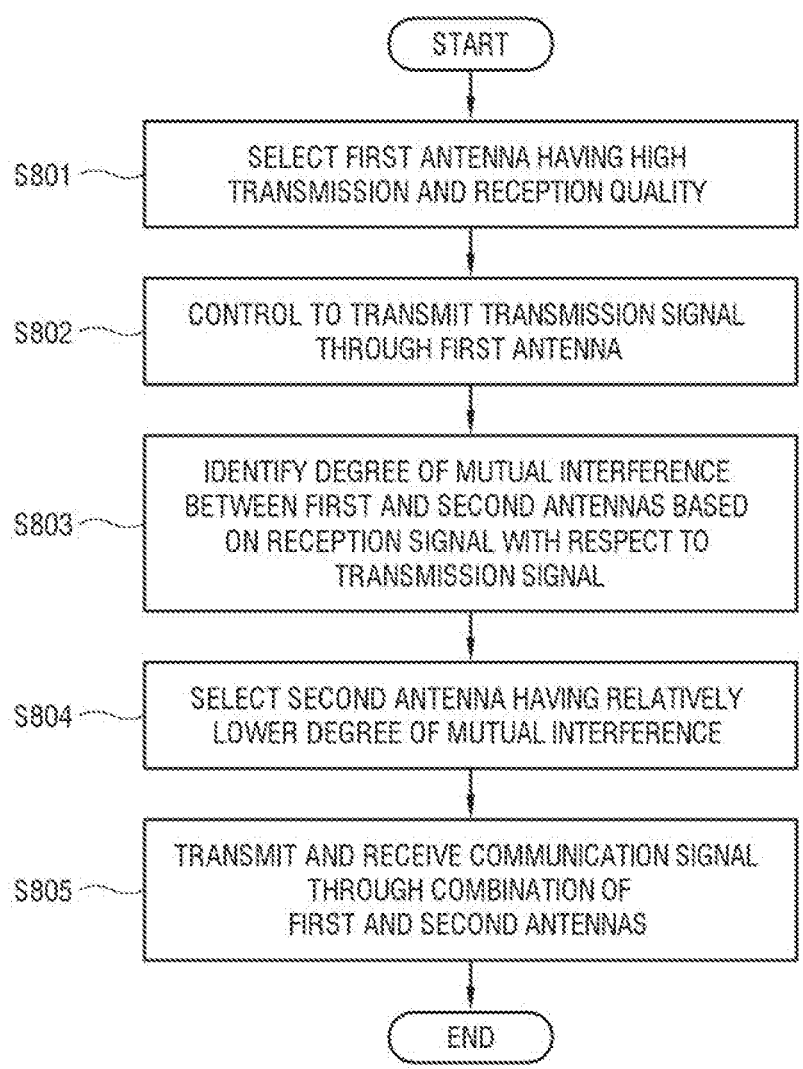
FIG. 8 illustrates another example of selecting a combination of antennas, which has a relatively lower degree of mutual interference between antennas, by a controller according to an embodiment of the disclosure.

In the foregoing embodiment, the combination of antennas, e.g. having a relatively lower degree of mutual interference is selected to measure the degree of mutual interference between all pairs of antennas. However, the embodiment of the disclosure is not limited to the foregoing. As another example, the first antenna may be selected in advance in accordance with predetermined standards, and then only the degree of mutual interference between the first antenna and remaining antennas may be measured to select a combination of antennas having a relatively lower degree of mutual interference. This will be described with reference to FIG. 8.

The controller 120 of the electronic device 100 according to the embodiment selects a first antenna in advance, which will be included in a combination of antennas, in accordance with a predetermined standard. For example, the antenna having the highest transmission and reception quality is selected as the first antenna out of the plurality of antennas 101-104 (S801). However, the predetermined standard for selecting the first antenna is not limited to the transmission and reception quality, and may vary as long as it may be used to select one from various antennas.

Then, the controller 120 controls the communication unit 110 to transmit a communication signal through the first antenna selected as above (S802), and with respect to antennas other than the first antenna, identifies the degree of mutual interference between the first antennas and the other antennas based on a reception signal of the foregoing signal (S803). That is, only the degree of mutual interference between the selected first antenna and the remaining antennas rather than between all pairs of antennas is measured.

Based on the result of identification, the controller 120 selects the combination of antennas having a relatively lower degree of mutual interference (S702), and controls the communication unit 110 to transmit and receive a communication signal through the selected combination of antennas (S703).

Accordingly, as it is possible to select the combination of antennas by measuring only the degree of mutual interference between the first antenna selected by a predetermined standard and remaining antennas, the foregoing method is more efficient than the method for selecting the combination of antennas by measuring the degree of mutual interference among all antennas.

In the process of transmitting and receiving a communication signal through the combination of antennas selected by one of the foregoing methods and of performing operations, the electronic device 100 according to an embodiment of the disclosure may renew the combination of antennas. As an example, if the quality of a signal transmitted and received through the selected combination of antennas is deteriorated, the electronic device 100 may renew the combination of antennas. As another example, whenever certain time elapses, the electronic device 100 may periodically renew the combination of antennas. However, the circumstances or event whereby the combination of antennas is renewed is not limited to the foregoing examples.

Embodiments of the renewal of the combination of antennas will be described with reference to FIGS. 9 and 10.

Figure 9:
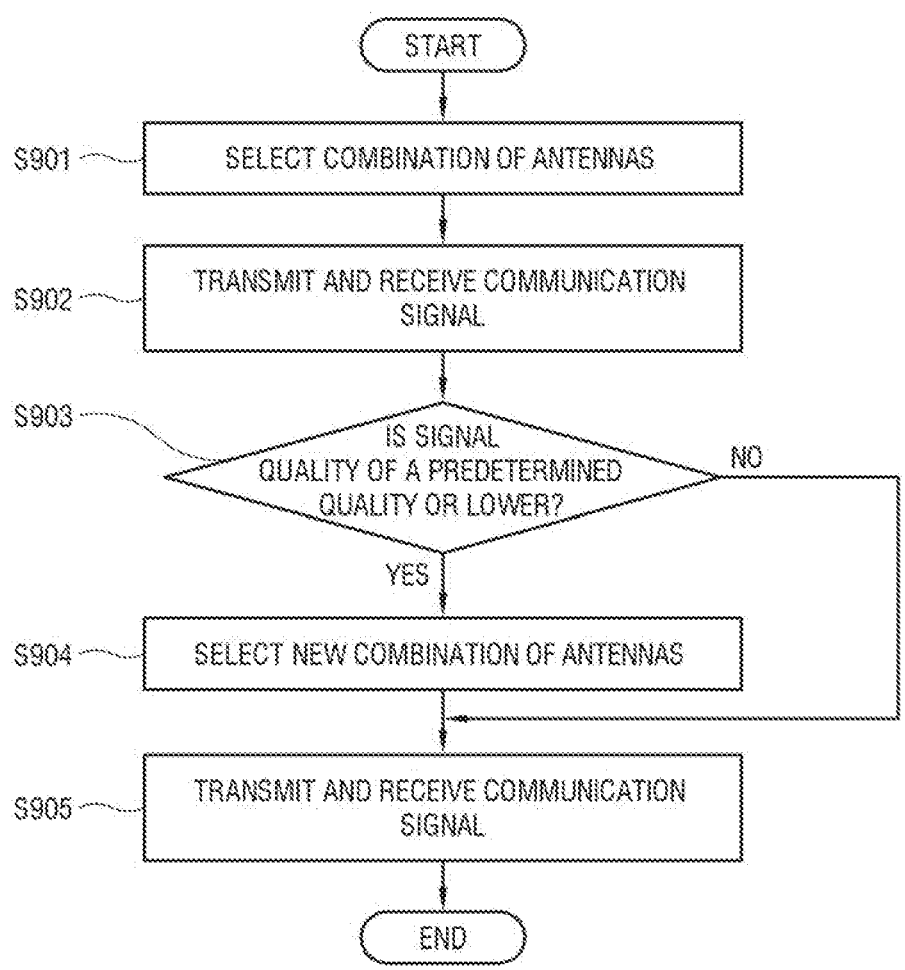
FIG. 9 illustrates an example of renewing a combination of antennas by a controller according to an embodiment of the disclosure.
Figure 10:
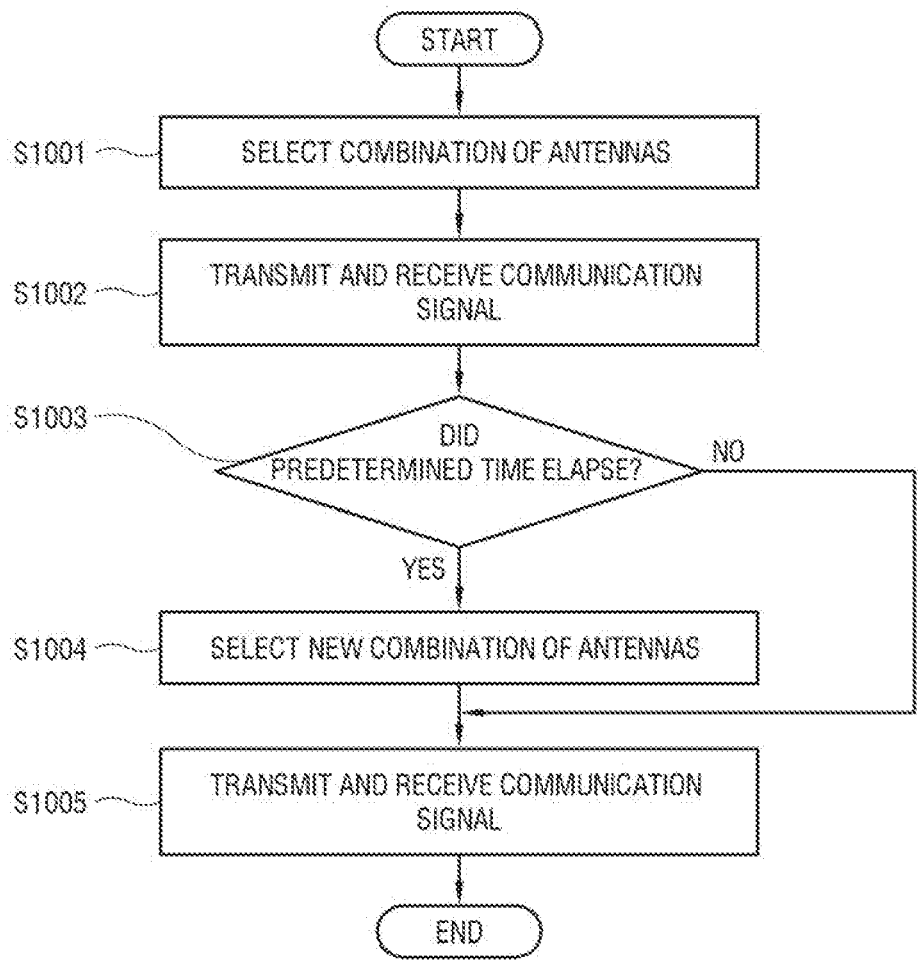
FIG. 10 illustrates another example of renewing a combination of antennas by a controller according to an embodiment of the disclosure.

In FIG. 9, the controller 120 of the electronic device 100 according to an embodiment of the disclosure selects the combination of antennas by one of the aforementioned methods (S901), and transmits and receives a communication signal (S902). During the process, if it is identified that the quality of the transmitted and received signal is of a predetermined standard or lower (S903), the controller 120 selects a new combination of antennas. The predetermined standard is a value serving as a standard for determining necessity of renewal of the combination of antennas, and may be set in advance or may be set by a user. There is no specific limitation on the method for selecting the new combination of antennas, and any of the aforementioned methods may be used to select the new combination of antennas (S904). Then, the controller 120 may control to transmit and receive a communication signal through the renewed combination of antennas (S905). Meanwhile, if the quality of the transmitted and received signal is higher than the predetermined standard even through an existing combination of antennas, the controller 120 determines that the renewal of the combination of antennas is not necessary and continues transmission and reception of a communication signal through the existing combination of antennas (S905).

As another example of renewing the selected combination of antennas, the combination of antennas may periodically be renewed whenever certain time elapses. More specifically, referring to FIG. 10, the controller 120 of the electronic device 100 according to an embodiment of the disclosure selects the combination of antennas by one of the aforementioned methods (S1001) and transmits and receives a communication signal (S1002). If it is identified that certain time has elapsed (S1003), the controller 120 selects a new combination of antennas. The expression "certain time" may be set in advance or may be set by a user. There is no specific limitation on the method for selecting the new combination of antennas, and any of the aforementioned methods may be used to select a new combination of antennas (S1004). Then, the controller 120 may control to transmit and receive a communication signal by the renewed combination of antennas (S1005). Meanwhile, if the quality of the transmitted and received signal is higher than the predetermined standard even through an existing combination of antennas, the controller 120 determines that the renewal of the combination of antennas is not necessary and continues transmission and reception of a communication signal through the existing combination of antennas (S1005).

Accordingly, the transmission and reception quality of a communication signal may be continuously maintained.

Figure 11:
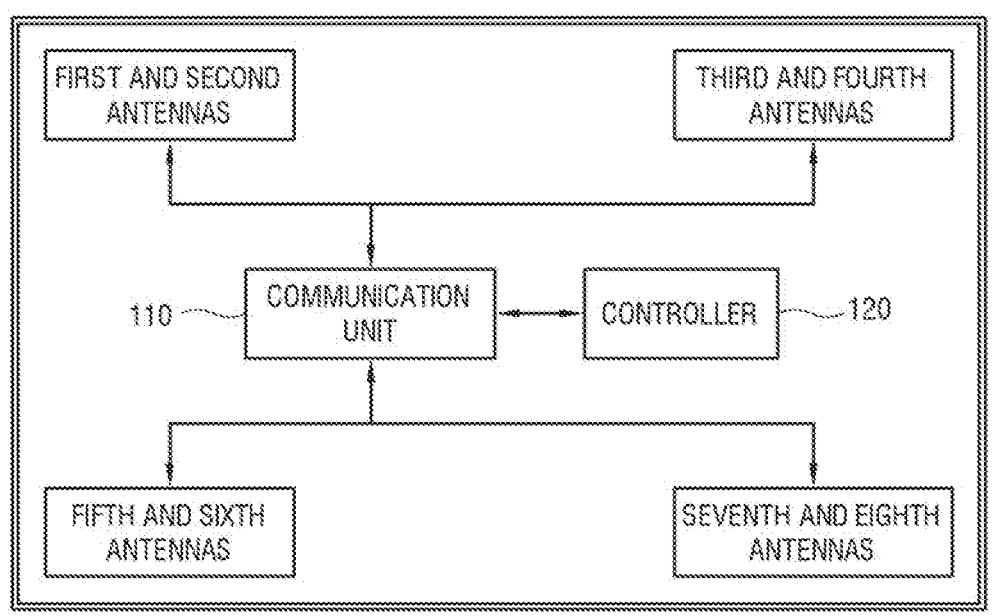
FIG. 11 is a block diagram of an electronic device according to another embodiment of the disclosure.
Figure 12:
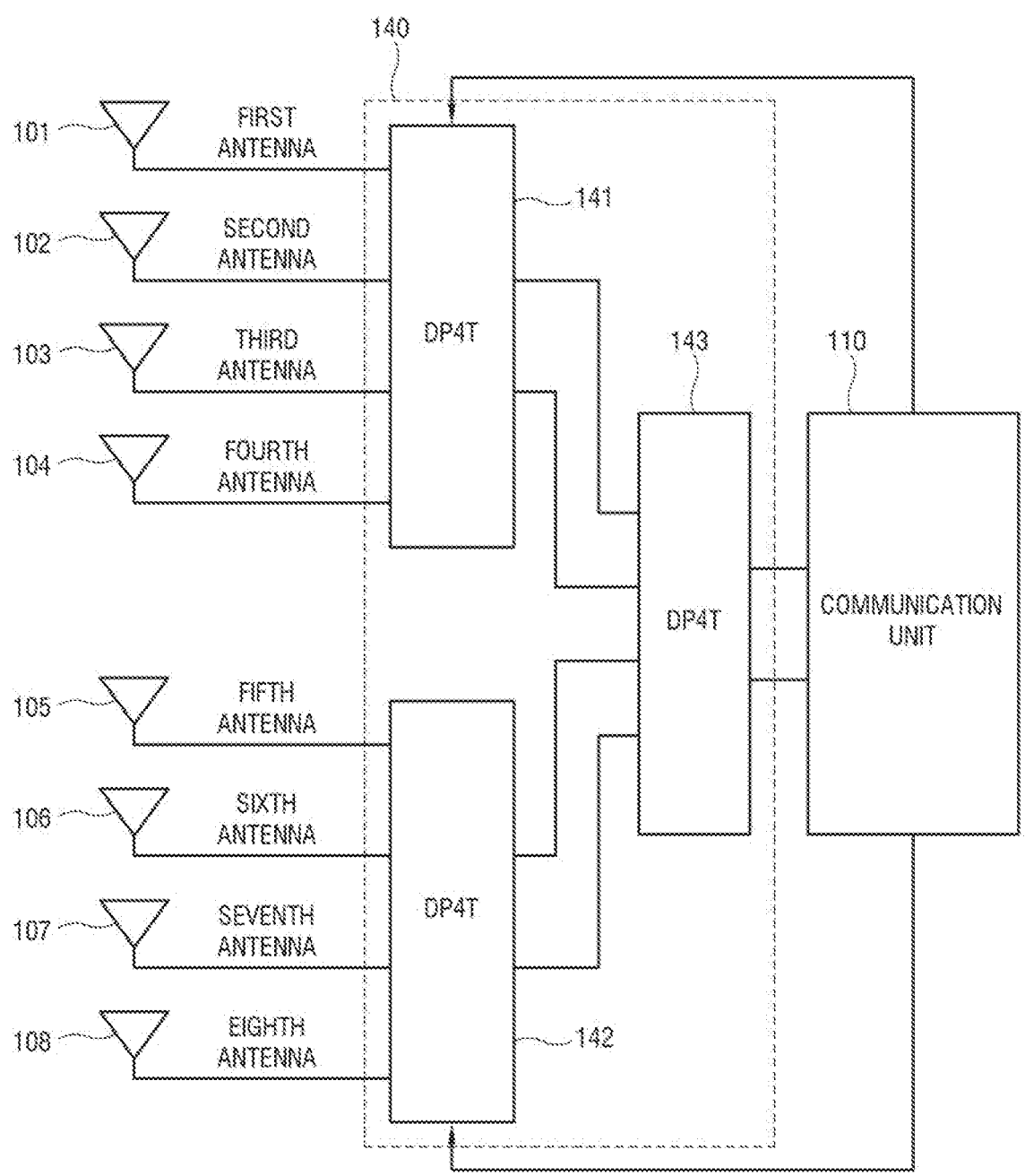
FIG. 12 illustrates an example of selecting a combination of antennas in the electronic device according to the another embodiment of the disclosure.

FIGS. 11 and 12 illustrate other embodiments of the disclosure.

FIG. 11 illustrates a configuration of an electronic device according to another embodiment of the disclosure. The electronic device 100 according to the present embodiment includes a total of eight antennas. Therefore, if a combination of two or more antennas having a relatively higher quality is selected, a combination of four or more antennas may also be selected. In such case, the disclosure may apply to 4×4 or more MIMO antenna technology.

In FIG. 11, each antenna module includes, e.g. two antennas, but the present embodiment is not limited to the foregoing. For example, eight antenna modules each of which includes only one antenna may be provided in a housing. Otherwise, part of the antenna modules may include one module and the remaining antenna modules may include two antennas. Furthermore, the total number of antennas or the number of antenna modules is not limited to the present embodiment.

FIG. 12 illustrates an example of a configuration for selecting a combination of antennas by an electronic device according to another embodiment of the disclosure. For example, the electronic device 100 according to the another embodiment of the disclosure includes a total of eight antennas 101-108. If a combination of antennas including four antennas is selected to transmit and receive a communication signal to which 4×4 MIMO antenna technology has applied, a switch 140 may be formed by three DP4T switches 141-143 as in FIG. 12. However, the type or number of switches is not limited to the foregoing.

Accordingly, the disclosure may also be used for 4×4 or more MIMO antenna technology.

The invention claimed is:

1. An electronic device comprising:
   a housing;
   a plurality of antennas respectively installed in a plurality of locations spaced from each other in the housing;
   a communicator configured to transmit and receive a communication signal through the plurality of antennas; and
   at least one processor configured to:
      control the communicator to transmit a transmission signal through a first antenna among the plurality of antennas,
      identify a degree of mutual interference between the first antenna and a second antenna among the plurality of antennas based on a reception signal of the second antenna that has received the transmission signal,
      select a combination of two or more antennas having a relatively lower degree of mutual interference among the plurality of antennas, and
      control the communicator to transmit and receive the communication signal through the selected combination of the two or more antennas.

2. The electronic device according to claim 1, wherein the first antenna comprises an antenna that has a relatively higher transmission and reception quality of the transmission signal out of amonq the plurality of antennas.

3. The electronic device according to claim 1, wherein the housing has a rectangular shape, and the plurality of antennas comprises an antenna located adjacently to each corner of the housing.

4. The electronic device according to claim 1; wherein the plurality of antennas and the communicator are integrally provided.

5. The electronic device according to claim 4, further comprising:
  a switch arranged between the plurality of antennas and the communicator,
  wherein the at least one processor is configured to control the switch to connect the selected combination of the two or more antennas to the communicator.

6. The electronic device according to claim 4, wherein the at least one processor is configured to attempt to select a new combination of antennas when a quality of a communication signal transmitted and received through a previously selected combination of antennas is a predetermined standard or lower.

7. The electronic device according to claim 4, wherein the at least one processor is configured to attempt to select a new combination of antennas when a predetermined time elapses after the transmission signal is transmitted and received through a previously selected combination of antennas.

8. The electronic device according to claim 4, wherein the at east one processor is configured to:
  control the communicator to transmit a communication signal, which the plurality of antennas requests for connection for communication; and
  measure a transmission quality of the plurality of antennas based on a feedback signal to the communication signal.

9. A control method of electronic device comprising a communicator configured to transmit and receive a communication signal through a plurality of antennas installed in a plurality of locations spaced from each other in a housing, the control method comprising:
  controlling the communicator to transmit a transmission signal from a first antenna among the plurality of antennas; and
  identifying a degree of mutual interference between the first antenna and a second antenna among the plurality of antennas based on a reception signal of the second antenna that has received the transmission signal;
  selecting a combination of two or more antennas having a relatively lower degree of mutual interference among the plurality of antennas; and
  controlling the communicator to transmit and receive the communication signal through the selected combination of the two or more antennas.

10. The control method according to claim 9, wherein the first antenna comprises an antenna that has a relatively higher transmission and reception quality of the transmission signal among the plurality of antennas.

11. The control method according to claim 9,
  wherein the electronic device comprises a switch arranged between the plurality of antennas and the communicator, and
  wherein the control method comprises controlling the switch to connect the selected combination of the two or more antennas to the communicator.

* * * * *